United States Patent
Jeong et al.

(10) Patent No.: US 7,088,544 B2
(45) Date of Patent: Aug. 8, 2006

(54) METHOD FOR CONTROLLING MOVEMENT OF HEAD IN DATA STORAGE DEVICE AND DISK DRIVE EMPLOYING THE METHOD

(75) Inventors: Ki-tag Jeong, Hwanseong-si (KR); Chul-woo Lee, Seongnam-si (KR); Jae-myung Jung, Suwon-si (KR); Jun Jeong, Suwon-si (KR); Dae-sik Hong, Suwon-si (KR); Han-rae Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/059,602

(22) Filed: Feb. 17, 2005

(65) Prior Publication Data
US 2005/0201002 A1 Sep. 15, 2005

(30) Foreign Application Priority Data
Feb. 17, 2004 (KR) .......................... 10-2004-10453

(51) Int. Cl.
*G11B 21/02* (2006.01)
(52) U.S. Cl. ....................................................... 360/75
(58) Field of Classification Search ...................... None
See application file for complete search history.

(56) References Cited

U.S. PATENT DOCUMENTS

| | | | | |
|---|---|---|---|---|
| 5,982,573 A * | 11/1999 | Henze | ......................... | 360/75 |
| 6,633,448 B1 * | 10/2003 | Smith et al. | .................. | 360/69 |
| 6,744,577 B1 * | 6/2004 | Guo et al. | .................... | 360/31 |
| 2003/0067705 A1 * | 4/2003 | Ishiyama et al. | ............. | 360/75 |

FOREIGN PATENT DOCUMENTS

| | | |
|---|---|---|
| JP | 11-238331 | 8/1999 |
| JP | 2002-109840 | 4/2002 |
| KR | 1992-14885 | 10/1998 |

* cited by examiner

Primary Examiner—Wayne Young
Assistant Examiner—Mitchell R. Slavitt
(74) Attorney, Agent, or Firm—Staas & Halsey LLP

(57) ABSTRACT

A method for controlling a disk drive includes: detecting an amount of an impact applied to the disk drive, and determining whether the detected amount exceeds a critical value; reading position information of a cylinder, over which a head is positioned, when the detected amount exceeds the critical value, and suspending a command being implemented; determining whether the read cylinder number exceeds a reference cylinder number; and moving the head in an innermost peripheral direction of the disk when the read cylinder number exceeds the reference cylinder number, and moving the head in an outermost peripheral direction of the disk when the read cylinder number does not exceed the reference cylinder number.

16 Claims, 4 Drawing Sheets

METHOD FOR CONTROLLING MOVEMENT OF HEAD IN DATA STORAGE DEVICE AND DISK DRIVE EMPLOYING THE METHOD

CROSS-REFERENCE TO RELATED APPLICATION

This application claims the priority of Korean Patent Application No. 2004-10453, filed on Feb. 17, 2004, in the Korean Intellectual Property Office, the disclosure of which is incorporated herein by reference.

BACKGROUND OF THE INVENTION

1. Field of the Invention

The present invention relates to a servo control method and apparatus of a data storage device, and more particularly, to a method of controlling movement of a head in a data storage device, by which the head is moved to a safety region when an external impact of sufficient magnitude is applied to a disk drive, and a disk drive employing the method.

2. Description of Related Art

A typical example of a technique for controlling movement of a head in a data storage device is disclosed in Japanese Patent Publication No. 2002-109840, in which an error in determining a position of the head due to the external impact is reduced by detecting impact applied in directions of x- and y-axes to a surface of a disk by a sensor and calculating a component of the impact in a rotation direction on the basis of information on a present position of the disk read from the head.

Generally, a hard disk drive as a kind of the data storage device is adapted to read data from the disk or write the data on the disk by use of a magnetic head and thus to contribute to an operation of a computer system. A compact high-capacity and high-density hard disk drive has been developed to be employed as means for storing the data in a multimedia system.

The hard disk drive serves to magnetically write or read the information on or from a turning disk. Such a hard disk drive generally includes a disk assembly and an actuator assembly. The disk assembly includes at least one magnetic disk coupled to a hub rotated by an electric motor. The actuator assembly includes an actuator arm having one end supporting the components for writing or reading the data on or from the magnetic disk and the other end coupled to the motor which enables movement of the actuator arm.

As a result of the increased portability of personal computers, the hard disk drive is increasingly likely to be exposed to external impact. If the external impact is applied to the hard disk drive while the hard disk drive reads or writes the data from or on the disk, there is an ample possibility of the head contacting the surface of the disk. When the head contacts the surface of the disk, there is a damage to the disk or head.

BRIEF SUMMARY

An aspect of the present invention provides a method for controlling movement of a head in a data storage device, in which the head is quickly moved to a safety region, in consideration of a position of the head on a disk, depending on amount of external impact applied to a disk drive, and a disk drive employing the method.

According to one aspect of the present invention, there is provided a method for controlling a disk drive, including: detecting an amount of an impact applied to the disk drive, and determining whether the detected amount exceeds a critical value; reading position information of a cylinder, over which a head is positioned, when the detected amount exceeds the critical value, and suspending a command being implemented; determining whether the read cylinder number exceeds a reference cylinder number; and moving the head in an innermost peripheral direction of the disk when the read cylinder number exceeds the reference cylinder number, and moving the head in an outermost peripheral direction of the disk when the read cylinder number does not exceed the reference cylinder number.

According to another aspect of the present invention, there is provided a data storage device including: an impact detecting unit which generates an electric signal corresponding to an amount of impact; a disk; an actuator for moving a read/write head across a surface of the disk; and a controller which calculates an amount of impact based on the electric signal, and when the calculated amount of the impact exceeds a critical value, controls the actuator to move the head in a direction less influenced by the impact according to a position of the head on the disk.

According to another aspect of the present invention, there is provided a method of designing a disk drive, including: controlling, via circuit, movement of a head to move the head in a direction less influenced by an impact according to a position of the head, when an amount of impact exceeding a predetermined critical value is detected.

According to another aspect of the present invention, there is provided a data storage device including: an impact detector which generates an electric signal corresponding to an amount of impact; and a controller which calculates an amount of impact based on the electric signal, and when the calculated amount of the impact exceeds a critical value, causes a read/write head to move toward either of two positions of a disk where any contact between the read/write head and the disk is less likely to damage the disk.

According to another aspect of the present invention, there is provided a method of controlling a disk drive, including: moving a head toward an innermost periphery of a disk when an amount of impact exceeds a critical value and the head is positioned in an inner peripheral region of the disk; and moving the head toward an outermost periphery of the disk when the amount of impact exceeds the critical value and the head is positioned in an outer peripheral region of the disk. The position of the head is based on a distance from a reference cylinder in the middle of the disk.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
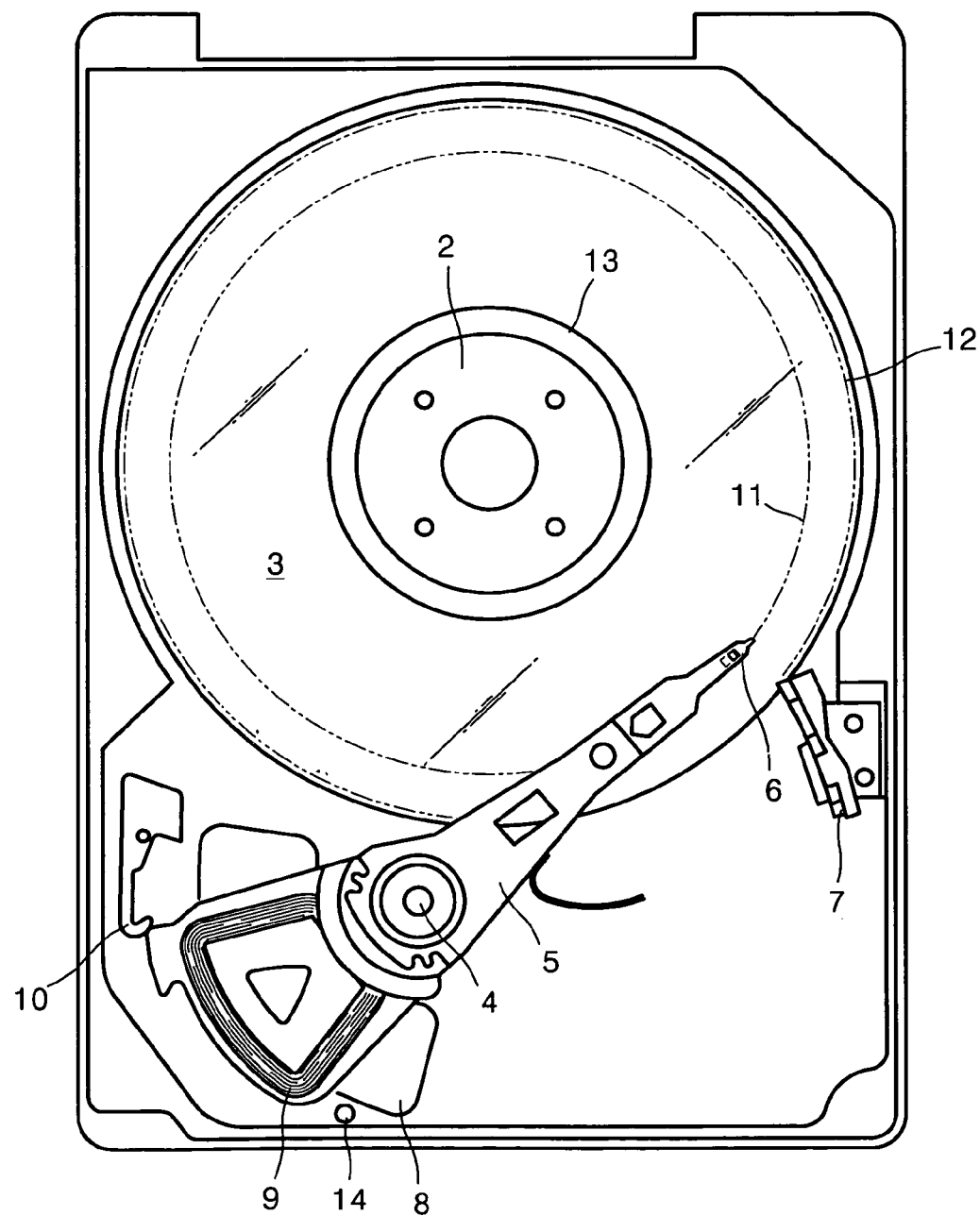
FIG. 1 is a top view of a hard disk drive to which an embodiment of the present invention is applicable.

Reference will now be made in detail to an embodiment of the present invention, examples of which are illustrated in the accompanying drawings, wherein like reference numerals refer to the like elements throughout. The embodiment is described below in order to explain the present invention by referring to the figures.

Referring to FIG. 1 showing a hard disk drive according to an embodiment of the present invention, the hard disk drive includes at least one magnetic disk 3 turned by a spindle motor 2. The hard disk drive also includes a head 6 disposed adjacent to a surface of the magnetic disk 3.

The head 6 detects a magnetic field of the disk 3 and magnetizes the disk 3, so as to read or write (i.e., transfer) data from or on the disk 3. The head is generally associated with the surface of the disk 3. While a unitary head 6 is illustrated and described herein, but the head includes of a write head for magnetizing the disk 3 and a read head for detecting the magnetic field of the disk 3. The read head may be constructed from a magneto-resistive (MR) material.

The head 6 is attached to an actuator arm 5 having a voice coil 9. The voice coil 9 is disposed adjacent to a magnetic assembly 8 specifying a voice coil motor (VCM) (not shown). As such, current supplied to the voice coil 9 generates torque to rotate the actuator arm 5 around a bearing assembly 4. The rotation of the actuator arm 5 causes the head 6 to move across the surface of the disk 3.

A combination of the bearing assembly 4, the actuator arm 5, the magnetic assembly 8, and the voice coil 9 to move the head 6 is generally referred to as an actuator.

When the power is turned off or the hard disk drive is in a sleep mode, the head 6 is secured to a ramp 7, and the actuator is locked by a latch 10. Therefore, if the external impact is applied to the hard disk drive, the head 6 is not moved to prevent the head 6 from being collided with other components, for example, the disk 3.

A stopper 14 prevents the head 6 from moving towards an inner periphery beyond an innermost cylinder region 13 of the disk 3 where the data cannot be written.

Figure 3:
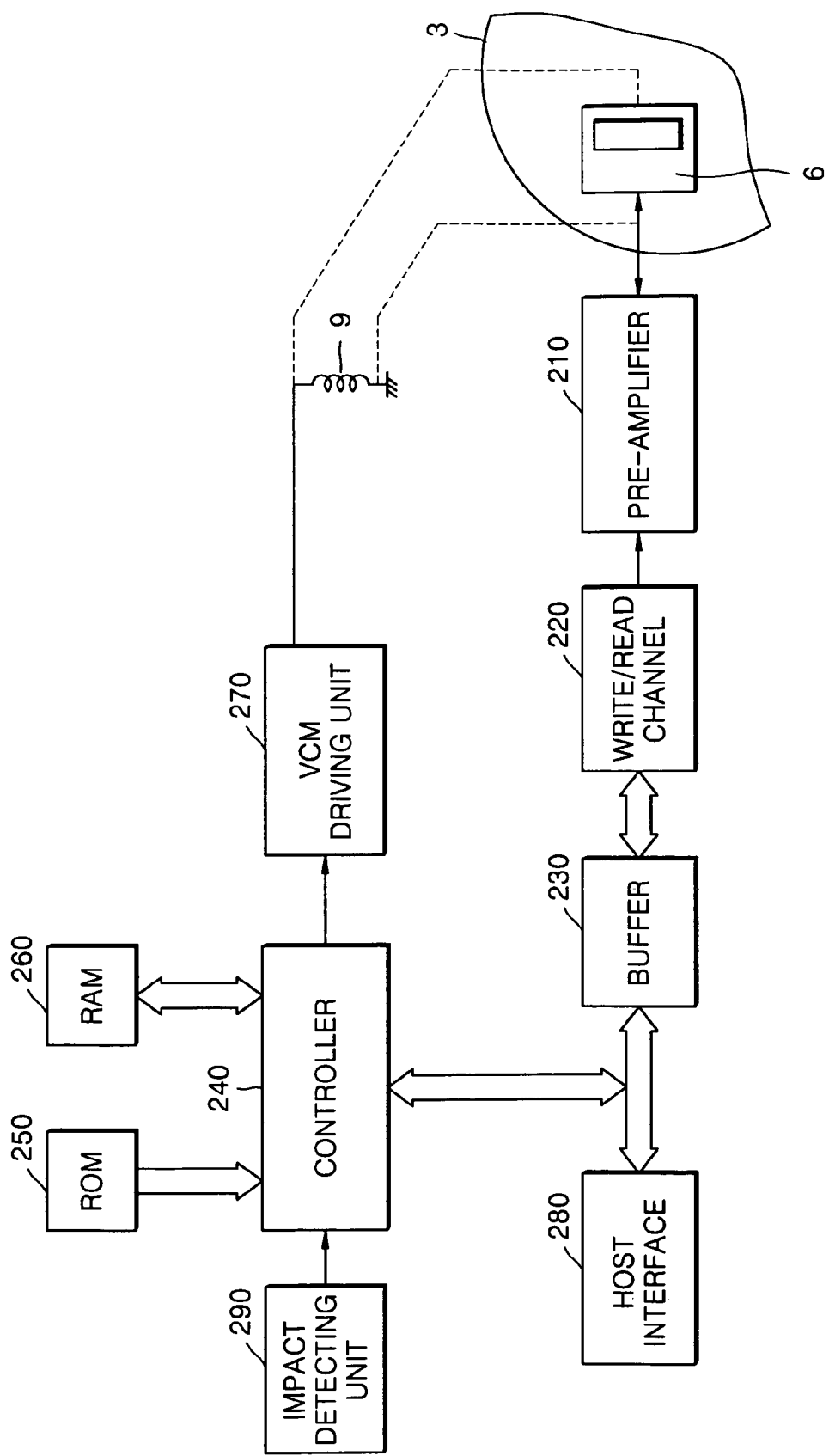
FIG. 3 is an electric circuit diagram of a hard disk drive according to an embodiment of the present invention.

FIG. 3 shows an electric circuit diagram of the hard disk drive according to the present embodiment.

Referring to FIG. 3, the hard disk drive of the present embodiment includes a disk 3, a head, 6, a pre-amplifier 210, a write/read channel 220, a buffer 230, a controller 240, a ROM 250, a RAM 260, a voice coil motor driving unit 270, a host interface 280, and an impact detecting unit 290.

The disk 3 includes a plurality of annular tracks (not shown), and each track has a plurality sectors. Each sector consists of a data field and an identification field. The identification field includes a Gray code identifying a sector and a track (cylinder). Data required for operation of the hard disk drive is written in a specific region of the disk 3, which is referred to as maintenance cylinder region. This region is a disk region which a user cannot access.

The ROM 250 stores various programs and data to control the hard disk drive, and the RAM 260 stores the data required for the operation of the hard disk drive, which is read from the maintenance region of the disk 3 and loaded onto the RAM 260, on every booting.

The buffer 230 is stored in regular sequence with the data received from a host device via the host interface 280, in a write mode, and is stored in regular sequence with the data read from the disk 3 in a read mode.

The pre-amplifier 210 includes an amplifying circuit for amplifying a signal detected by the read head, and a read current control circuit for supplying an optimum read current to the read head. Also, the pre-amplifier 210 includes a write current control circuit for supplying a write current.

The impact detecting unit 290 detects an amount of impact applied to the hard disk drive to generate an electrical signal corresponding to the amount of impact.

Figure 2:
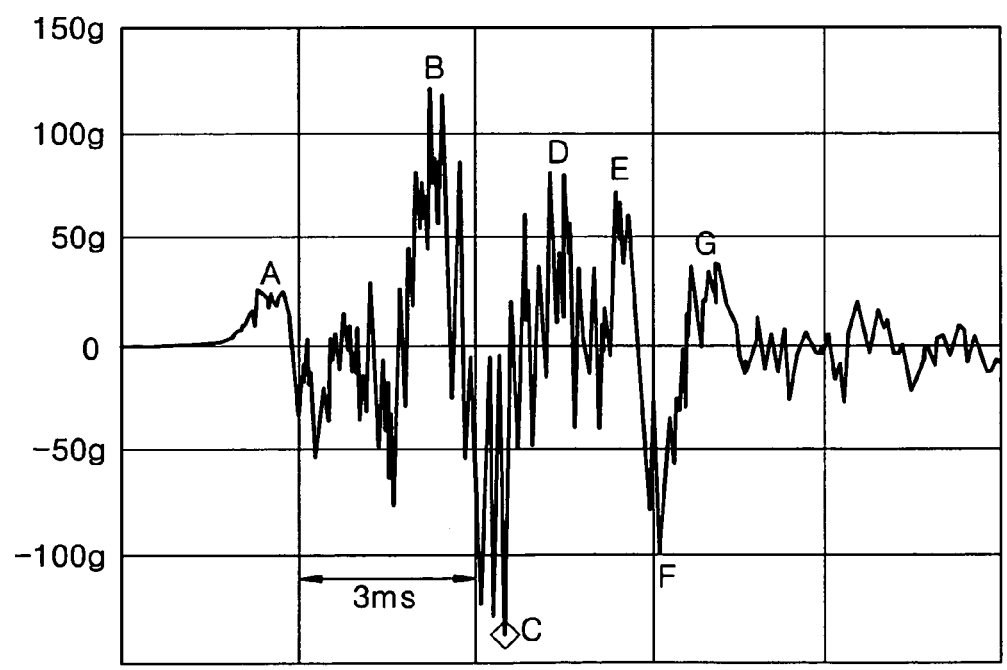
FIG. 2 is a spectrum of a vibration of a hard disk drive when external impact is applied to the hard disk drive of FIG. 1.

FIG. 2 shows a spectrum of a vibration of the hard disk drive when the external impact is applied to the hard disk drive, in which the impact pulse applied has a Gauss distribution having a pick value of 250 G and a retention time of 2 ms. The impact is represented by a vibration in the hard disk drive as indicated by A, B, C, D, E, F, G, . . . etc., in FIG. 2.

First, a general operation of disk drive is described.

In the data read mode, the electrical signal detected from the disk 3 by the read head 6 (referred to as transducer) is amplified by the pre-amplifier 210. Then, the write/read channel 220 encodes the amplified analog signal to a digital signal which can be read by the host device (not shown). After the digital signal is converted into a stream data and is temporarily stored in the buffer 230, the data is transferred to the host device via the host interface 280.

In the data write mode, the hard disk drive receives the data from the host device via the host interface 280, and temporarily stores the data in the buffer 230. After the data is outputted from the buffer 230 and is converted into a binary data stream by the write/read channel 220, the data stream is written to the disk 3 via the write head 6 by supplying the write current amplified by the pre-amplifier 210.

The controller 240 generally controls the hard disk drive, and analyzes commands received via the host interface 280 to implement the commands. The controller 240 is coupled to the VCM driving unit 270 supplying the driving current to the voice coil 9, and supplies a control signal to the VCM driving unit 270 to control the movement of the head 6.

The VCM driving unit 270 supplies the current corresponding to the control signal applied from the controller 240 to the voice coil 9 to move the actuator including the head 6.

The controller 240 calculates the amount of impact by use of the electric signal inputted from the impact detecting unit 290, and implements a process of comparing the calculated amount of impact with a critical value, in the read or write mode. If the calculated amount of the impact exceeds the critical value, the position of the head 6 is read by use of a Gray code. The controller controls the actuator to move the head 6 in a direction less influenced by the impact according to the read cylinder number. The critical value means an amount of maximum impact at which the hard disk drive can normally operate.

Specifically, when the calculated amount of impact exceeds the critical value, if the head 6 is positioned in an inner peripheral region of the disk on the basis of a reference cylinder, the controller 240 outputs the driving control signal for the actuator to the voice coil motor driving unit 270, thereby controlling the movement of the actuator to move the head 6 in a direction of the innermost periphery (indicated by 13 in FIG. 1) of the disk 3. If the head 6 is positioned in an outer peripheral region of the disk including the reference cylinder on the basis of the reference cylinder, the controller 240 outputs the driving control signal for the actuator to the voice coil motor driving unit 270, thereby controlling the movement of the actuator to move the head 6 in a direction of the outermost periphery (indicated by 12 in FIG. 1) of the disk 3.

The driving control signal for the actuator is adapted to move the head 6 in a maximum speed to which the actuator is allowable, such that the head 6 can quickly move to the safety region against the impact.

When implementing the process of moving the head 6 in the outermost direction to protect the hard disk drive against the external impact, if a ramp 7 is installed to the hard disk drive, the controller 240 controls the movement of the actuator to unload the head 6 onto the ramp 7.

When the controller 240 detects the amount of the impact exceeding the critical value, it suspends any presently implemented command, because of having a difficulty in implementing the normal operation.

The reference cylinder determining the moving direction of the head 6 in the safety region against the impact is designated as a cylinder positioned at a position which is deviated from a half position between the innermost periphery of the disk 3 and the outermost periphery toward the outer periphery by a constant distance. Since the outer peripheral region of the disk 3 is more influenced by the impact over the inner peripheral region, it is required that the controller quickly moves the head 6 to the safety region.

Figure 4:
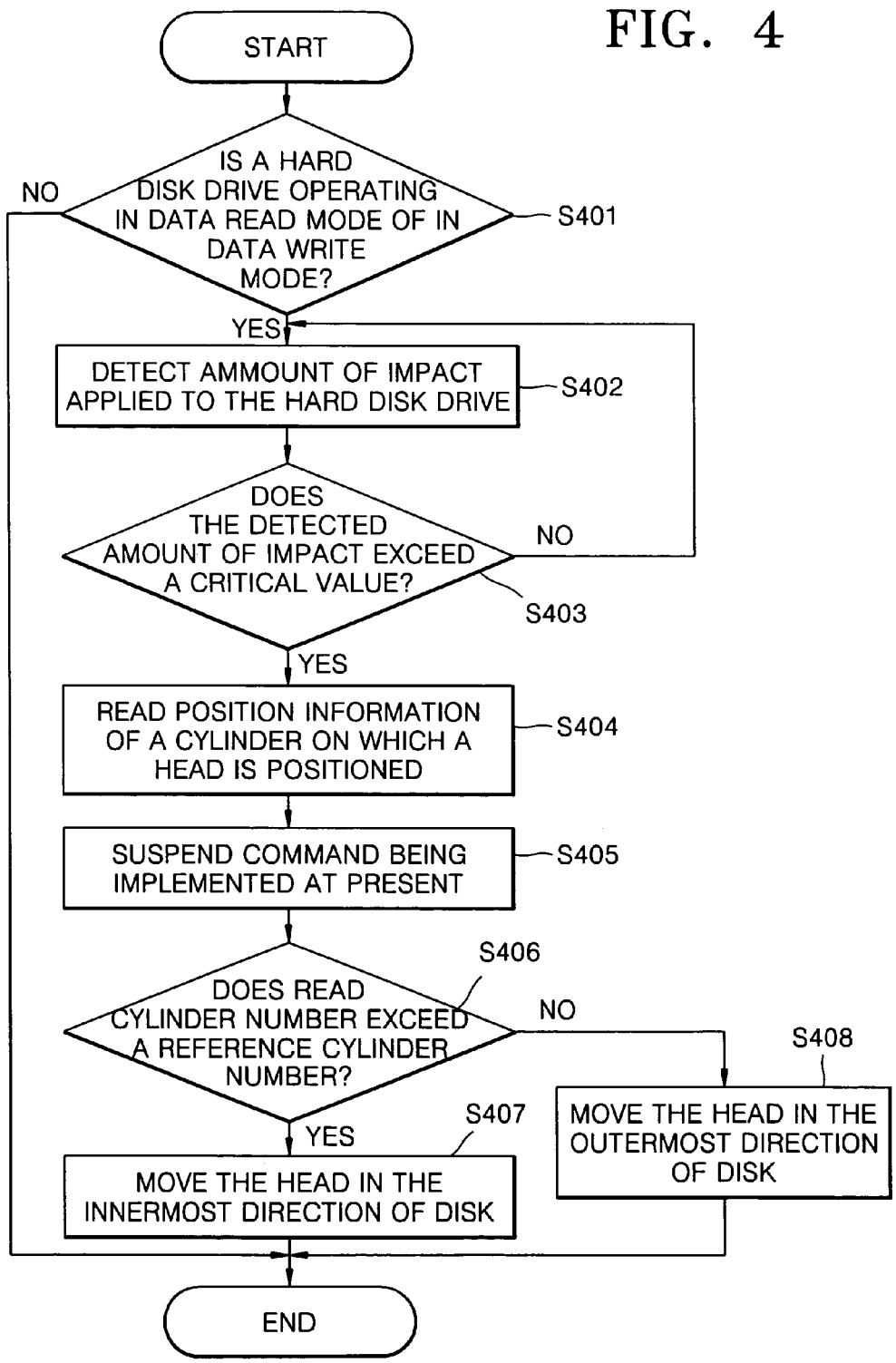
FIG. 4 is a flowchart showing a method of controlling movement of a head in a data storage device according to an embodiment of the present invention.

Reference is now made to a flowchart of FIG. 4 to describe the method for controlling the movement of the head in the data storage device according to the present invention.

First of all, the controller 240 determines whether the hard disk drive is operating in the data read mode or in the data write mode (S401).

If the hard disk drive is operating in the data read mode or in the data write mode, the impact detecting unit 290 (referred to as impact sensor) continuously detects the amount of impact applied to the hard disk drive (S402).

Then, the controller 240 determines whether or not the detected amount of impact exceeds the critical value (S403).

If the detected amount of impact exceeds the critical value, the controller 240 reads position information of the cylinder, on which the head 6 is positioned, from the disk 3 (S404). The read of the position information of the cylinder utilizes the Gray code recorded in the disk 3.

Then, the controller 240 suspends the command being implemented at present and determines whether or not the read cylinder number exceeds a reference cylinder number (S406). The reference cylinder is designated as a cylinder disposed at a position where is deviated from a half position between the innermost periphery (indicated by 13 in FIG. 1) of the disk 3 and the outermost periphery (indicated by 12 in FIG. 1) toward the outer periphery by a constant distance. Since the outer peripheral region of the disk 3 is more influenced by the impact over the inner peripheral region, the controller quickly moves the head 6 to the safety region.

If the read cylinder number exceeds the reference cylinder number, it corresponds to a case where the head 6 is positioned in the inner peripheral region of the disk on the basis of the reference cylinder. At this time, the controller 240 controls the movement of the actuator to move the head 6 in the innermost direction (indicated by 13 in FIG. 1) of the disk 3 (S407).

However, if the read cylinder number does not exceed the reference cylinder number, it corresponds to a case where the head 6 is positioned in the outer peripheral region of the disk on the basis of the reference cylinder. At this time, the controller 240 controls the movement of the actuator to move the head 6 in the outermost direction (indicated by 12 in FIG. 1) of the disk 3 (S408).

The moving speed of the head in the processes S407 and S408 is set in a range of an allowable maximum speed for the hard disk drive.

When implementing the process S408 of moving the head 6 to the outermost periphery to protect the hard disk drive against the external impact, if the ramp 7 is installed to the hard disk drive, the controller 240 controls the movement of the actuator to unload the head 6 onto the ramp 7.

As such, if the impact exceeding the allowable amount of impact is applied to the hard disk drive during the operation of the hard disk drive, the moving direction of the head is determined according to the position of the head on the disk, so that the head is quickly moved to the safety region.

The above-described embodiment of the present invention can minimize the influence exerted onto the head and related components by the external impact.

The above-described embodiment of present invention may be accomplished by a method, an apparatus, a system, and software. Programs or code segments may be stored in a processor-readable medium, or may be sent by a computer data signal combined with a carrier wave via a transferring medium or communication network. The processor-readable medium includes any medium capable of storing or sending information. Examples of the processor-readable medium are an electronic circuit, a semiconductor memory device, a ROM, a flash memory, an erasable ROM, a floppy disk, an optical disk, a hard disk, an optical fiber medium, a radio frequency (RF) network, and the like. The computer data signal includes any signal, which can be transmitted through transmission medium, such as an electronic network channel, an optical fiber, air, an electromagnetic field, an RF network, and the like.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for controlling a disk drive, comprising:
   detecting an amount of an impact applied to the disk drive, and determining whether the detected amount exceeds a critical value;
   reading position information of a cylinder, over which a head is positioned, when the detected amount exceeds the critical value, and suspending a command being implemented;
   determining whether the read cylinder number exceeds a reference cylinder number; and
   moving the head in an innermost peripheral direction of the disk when the read cylinder number exceeds the reference cylinder number, and moving the head in an outermost peripheral direction of the disk when the read cylinder number does not exceed the reference cylinder number.

2. The method of claim 1, wherein the reference cylinder is disposed at a position which is deviated from a half position between the innermost periphery of the disk and the outermost periphery toward an outer periphery by a constant distance.

3. The method of claim 1, wherein the moving includes unloading the head onto a ramp, when the ramp is present.

4. The method of claim 1, wherein, in the moving, a moving speed of the head is an allowable maximum speed.

5. A method of designing a disk drive, comprising:
controlling, via a between circuit, movement of a head to move the head in a direction less influenced by an impact according to a position of the head, when an amount of impact exceeding a predetermined critical value is detected,
wherein the circuit moves the head toward in an innermost direction of a disk when the head is positioned in an inner peripheral region on the basis of a predetermined reference cylinder, and moves the head toward an outer peripheral region of the disk when the head is positioned in an outermost peripheral region of the disk, the positions determined on the basis of the predetermined reference cylinder.

6. The method of claim 5, wherein the reference cylinder is disposed at a position which is deviated from a half position between the innermost periphery of the disk and the outermost periphery toward an outer periphery by a constant distance.

7. The method of claim 5, wherein, when the head is moved in the outermost direction, the circuit controls the movement of the head such that, when a ramp is present, the head is unloaded onto the ramp.

8. The method of claim 5, wherein, the head moves at a maximum allowable speed.

9. A data storage device comprising:
an impact detecting unit which generates an electric signal corresponding to an amount of impact;
a disk;
an actuator for moving a read/write head across a surface of the disk; and
a controller which calculates an amount of impact based on the electric signal, and when the calculated amount of the impact exceeds a critical value, controls the actuator to move the head in a direction less influenced by the impact according to a position of the head on the disk,
wherein, when the amount of impact exceeds the critical value, a command being implemented is suspended.

10. The disk drive of claim 9, wherein, when the calculated amount of impact exceeds the critical value, the controller: controls the actuator to move the head in a direction of an innermost periphery of the disk, when the head is positioned in an inner peripheral region of the disk on the basis of a reference cylinder; and controls the actuator to move the head in a direction of an outermost periphery of the disk, when the head is positioned in an outer peripheral region of the disk comprising the reference cylinder on the basis of the reference cylinder.

11. The disk drive of claim 10, wherein the reference cylinder is disposed at a position which is deviated from a half position between the innermost periphery of the disk and the outermost periphery toward an outer periphery by a constant distance.

12. The disk drive of claim 10, wherein, in moving the head in the outermost direction, the controller controls the actuator to implement a process of unloading the head onto a ramp.

13. The disk drive of claim 9, wherein a moving speed of the head is an allowable maximum speed.

14. A computer-readable storage medium encoded with processing instructions for causing a processor to perform a method of controlling an actuator, the method comprising the step of:
controlling, via circuit, movement of a head to move the head in a direction less influenced by an impact according to a position of the head, when an amount of impact exceeding a predetermined critical value is detected,
wherein the circuit moves the head toward in an innermost direction of a disk when the head is positioned in an inner peripheral region on the basis of a predetermined reference cylinder, and moves the head toward an outer peripheral region of the disk when the head is positioned in an outermost peripheral region of the disk, the positions determined on the basis of the predetermined reference cylinder.

15. A data storage device comprising:
an impact detector which generates an electric signal corresponding to an amount of impact; and
a controller which calculates an amount of impact based on the electric signal, and when the calculated amount of the impact exceeds a critical value, causes a read/write head to move toward either of two positions of a disk where any contact between the read/write head and the disk is less likely to damage the disk,
wherein the head moves at a maximum allowable speed.

16. A method of controlling a disk drive, comprising:
moving a head toward an innermost periphery of a disk when an amount of impact exceeds a critical value and the head is positioned in an inner peripheral region of the disk; and
moving the head toward an outermost periphery of the disk when the amount of impact exceeds the critical value and the head is positioned in an outer peripheral region of the disk,
wherein the position of the head is based on a distance from a reference cylinder in the middle of the disk, and
wherein the head moves toward either periphery at a maximum allowable speed.

* * * * *

UNITED STATES PATENT AND TRADEMARK OFFICE
CERTIFICATE OF CORRECTION

| | | |
|---|---|---|
| PATENT NO. | : 7,088,544 B2 | Page 1 of 1 |
| APPLICATION NO. | : 11/059602 | |
| DATED | : August 8, 2006 | |
| INVENTOR(S) | : Ki-tag Jeong et al. | |

It is certified that error appears in the above-identified patent and that said Letters Patent is hereby corrected as shown below:

On the Title page:

(75) Inventors, Col. 1, line 1, change "Hwanseong-si" to --Hwaseong-si--

In the Claims:

Col. 7, line 2, after "via a" delete "between"

Signed and Sealed this

Ninth Day of January, 2007

JON W. DUDAS
*Director of the United States Patent and Trademark Office*